R. F. COOKE.
Horseshoes.
No. 155,365. Patented Sept. 29, 1874.
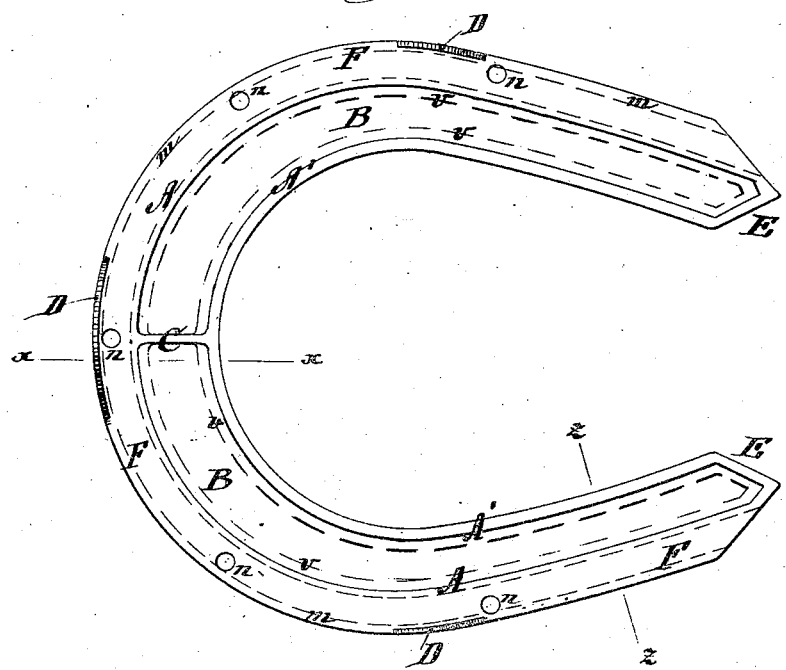
Fig. I.
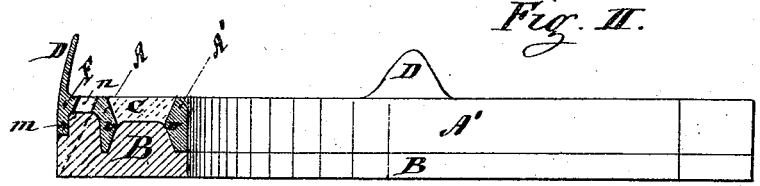
Fig. II.
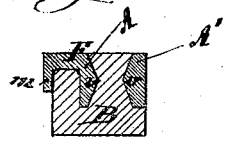
Fig. III.
Witnesses.
A. E. Collins
C. Thornton
Inventor.
Robert F. Cooke
per Henry E. Roeder
Attorney.

UNITED STATES PATENT OFFICE.

ROBERT F. COOKE, OF NEW YORK, N. Y.

IMPROVEMENT IN HORSESHOES.

Specification forming part of Letters Patent No. 155,365, dated September 29, 1874; application filed February 14, 1874.

*To all whom it may concern:*

Be it known that I, ROBERT F. COOKE, of New York, in the State of New York, have invented a new and Improved Horseshoe, of which the following is a description:

The nature of my invention consists in the arrangement of a frame or skeleton horseshoe made of malleable iron, into which india-rubber is cast, or attached to, projecting some distance below said skeleton iron shoe, and forming by this combination the desired horseshoe, which is attached to the horse's hoof by means of nails or any other practicable manner.

In the accompanying drawing, Figure I represents a top view of a horseshoe embodying my invention. Fig. II is a longitudinal section at line *x x*, Fig. I; and Fig. III is a cross-section at line *z z*, Fig. I.

A A' are frames, bent in the shape of a horseshoe, connected together at their ends at E, and near the center in front by the brace C. To the outer frame A a horizontal flange, F, is arranged flush with the top of the frames A A', and provided with suitable holes *n n*, for the nails to pass, to fasten the shoe unto the horse's hoof. On the outer edge of this flange F projections D, one at the center in the front and one on each side, are arranged, projecting upward, and which may be bent over the outside of the horse's hoof when the shoe is fastened on. On the inner sides of the frames A A', about near the middle of their heights, projections *v v* are made. These projections may consist of prongs or pointed projections, or of a raised part tapering toward the top and bottom of the frames, so as to make thereby the central part or space between said frames narrower than the top and bottom of said space, for the purpose of holding any material cast or pressed into this skeleton-frame perfectly tight without the necessity of any other fastenings. Into this space, between the frames A A', and under the flange F, crude india-rubber B is cast, projecting about one-quarter or one-half of an inch below the lowest part of the metal part of the shoe, and the outer and inner sides corresponding with the outer and inner sides of the metal part of the shoe.

For this purpose of casting or pressing the crude india-rubber into the skeleton metal shoe, and below the same, said metal shoe is placed into a suitable iron mold or form, and when filled or cast in the form is closed and the rubber vulcanized while in the skeleton-shoe.

By the arrangement of the prongs or projections *v v* this india-rubber will be held firmly in the frame or skeleton horseshoe without requiring any other fastening.

In some cases it may be desirable to arrange a flange, *m*, on the outer edge of the flange F, projecting some distance downward, and making the india-rubber either flush with the inner edge of said flange *m*, as shown in Fig. III, or with the outer surface of said flange, as shown in Fig. II, by which arrangement the outside of the india-rubber lining B will be confined and prevented from spreading.

What I claim as my invention, and desire to secure by Letters Patent, is—

A skeleton-horseshoe, consisting of an inner and outer frame, A and A', connected at their ends and by suitable braces C, and provided with projections *v v*, on the inner sides of the frames A A', and either with or without the outer flange *m*, in combination with the india-rubber filling B, substantially as and for the purpose set forth.

ROBERT F. COOKE.

Witnesses:
HENRY E. ROEDER,
C. THORNTON.